April 5, 1949.　　　　O. A. JOHNSON　　　　2,466,243
SWIVEL
Filed Jan. 11, 1946

INVENTOR.
ONEY A. JOHNSON
BY J. E. Trabucco
ATTORNEY

Patented Apr. 5, 1949

2,466,243

UNITED STATES PATENT OFFICE 2,466,243

SWIVEL

Oney A. Johnson, San Francisco, Calif.

Application January 11, 1946, Serial No. 640,441

4 Claims. (Cl. 59—95)

This invention relates to improvements in swivels, and more particularly to a novel swivel adapted for use with fishing tackle of the type employing rotating lures.

The primary object of my invention is to provide an improved swivel for use with fishing lines, cables or the like, embodying a novel construction which allows one section of a line or cable to freely rotate without twisting or tangling either section.

Another object of my invention is to provide a novel swivel having a self-aligning construction wherein ball bearings are arranged to insure the free rotation of one part of the swivel with respect to another part under varying load conditions. Another object of my invention is to provide a ball bearing swivel allowing the arrangement of a plurality of ball bearings in a constricted space by means of a novel construction and combination of bearing members. A further object of my invention is to provide a novel ball bearing swivel having a simple but rugged construction wherein the bearings are well protected against the entry of foreign particles and which may be easily taken apart for lubrication, inspection or cleaning purposes.

Other objects of my invention are: to provide a swivel having a construction wherein the bearings are well protected against accumulations of dirt or other foreign material which might interfere with the relative rotation of the parts of the swivel; to provide a swivel which may be easily taken apart and cleaned without the use of special tools; to provide a swivel wherein the relatively movable parts are automatically maintained in aligned positions, thereby avoiding undue friction or a binding action; and to provide a swivel having a streamline exterior which permits its pull through the water without undue resistance and without causing any appreciable turbulence or agitation to the surrounding water.

Further objects of my invention will be pointed out hereinafter or will become apparent upon reading the following disclosure.

Figure 1:
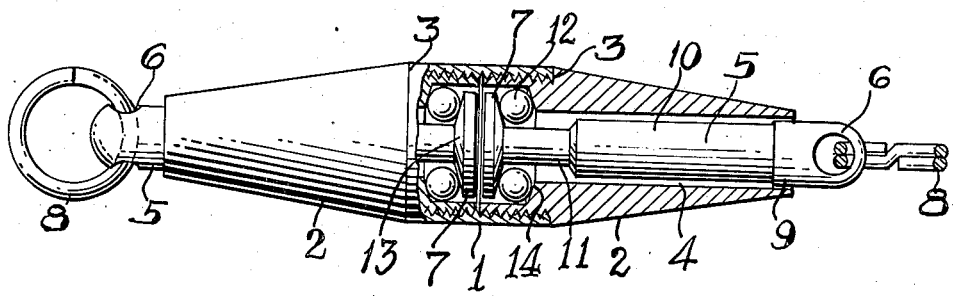
Fig. 1 is a side elevation of a swivel embodying my invention, showing parts broken away and in section.
Figure 2:
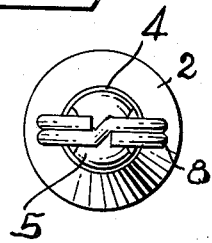
Fig. 2 is an end view of the swivel.

As shown in Fig. 1 my swivel embodies duplicate assemblies which are normally held in connected relationship by a threaded sleeve 1. The duplicate swivel assembles each comprise a gradually tapered body 2 having its large end exteriorily threaded and provided with an annular shoulder 3 against which an end of the sleeve 1 abuts. The sleeve is slightly oval in shape to provide sufficient friction between its threads and those of the connected bodies 2 to normally prevent the detachment of either of the latter. The ends of the sleeve being in close contact with the shoulders 3 of each body, prevents any dirt or foreign material from entering the interior of the device to foul the bearings or bearing surfaces. The two bodies 2 each have an axial bore 4 which are in alignment with one another.

Rotatably extending into each body 2 is a spindle 5 having an eye 6 formed at its outer end and a head 7 at its inner end. A split ring 8 secured to an eye 6 of each spindle provides attaching means for a line leader or the like, and also stop means engageable with the smaller end of the body to prevent the spindle from becoming detached from its associated body in the event the sleeve 1 is unscrewed for lubrication, cleaning or inspection purposes. Each spindle is formed at its outer end with an enlarged diameter as at 9 to provide a close clearance surface which normally prevents foreign material from entering the bore of its associated body 2. Each spindle is also formed with a portion having a smaller diameter, as at 10, which provides increased clearance and does not contact the body during the rotation of either of these relatively rotatable elements. Another portion of each spindle adjacent its head 7 is formed with a still smaller diameter as at 11, to provide sufficient space for the compact arrangement of a plurality of ball bearings 12. The ball bearings are preferably six in number and they are circularly arranged and are normally in engagement with opposed annular surfaces 13 and 14 formed respectively on the head 7 of a spindle and on a shoulder provided on its associated body 2. The opposed annular surfaces 13 and 14 are substantially parallel, and by providing a slight taper to the said surfaces with which the ball bearings engage the spindle is normally maintained during operation in a self-centered position with respect to the axial bore of its associated body 2. Since the spindles of the two assembles are normally maintained in centered and aligned positions friction is reduced to a minimum. It is evident that the spindle 5 will not contact its associated body 2 when a direct pull is exerted on the eye 6 through the split ring 8 since the tapered bearing surface 13 on the head 7 will cause the spindle to seek the center of the bore 4. This novel construction causes the self-centering of the spindles with respect to the bodies 2 during the normal operation of the device. A line or leader may be connected to either of the split rings 8 at any random point thereon, and upon a pull being applied thereto the split ring will turn or slide in the eye 6 to cause the pull to be in direct alignment with the rotational axis of the spindle, thereby preventing the latter at its larger diameter 9 from bearing against the body 2 and causing friction. The provision of a self-adjusting split ring for the purpose of connecting a line or leader to an end of the body makes it possible to have the pull applied in line with the spindle, thereby obviating the usual friction.

Since the diameter of the opening of the eye 6 is substantially the same as the diameter of the spindle at 11, the diameter of the spindle at 9 must be greater, otherwise sufficient strength cannot be given the eye. The increased diameter at 9 requires the bore 4 of the body 2 to be substantially twice that required for the clearance of the spindle 5 at 11. The compact arrangement of the ball bearings 12, each of a diameter substantially the same as a spindle at 11, necessitates providing a taper to the bearing surfaces 13 and 14 to prevent the ball bearings 12 from bearing on the edge of the bore 4. The taper on the bearing surface 13 of the head 7 of a spindle 5 is such that the ball bearings 12 bear inwardly toward the center of the spindle, and the taper of the bearing surface 14 on the body 2 is such that the said ball bearings bear outwardly from the bore 4, thereby providing full bearing surfaces for the ball bearings.

In practice, when the swivel is used with fishing tackle, one end of a fishing line is secured to one of the split rings 8 and a leader or line having a rotating lure and hook is secured to the other split ring. When in trawling, the line is drawn through the water and a drag is applied upon the rotating lure, there will be both pull and torque exerted on the split ring 8 connected to the lure, and a pull exerted on the split ring 8 connected to the line. Since the spindle to which the rotating lure is connected can rotate freely without causing its associated body 2 to also rotate there is normally very little chance of sufficient torque being transferred to the body of the other assembly to cause it to also rotate, but should it so happen that the rotary motion from the lure is imparted to both connected bodies there still will be no torque transmitted to the particular spindle connected to the fishing line since its associated body is free to rotate independently thereof. Thus, by providing the duplex connected swivel assemblies in the manner described the free rotation of the lure is permitted without the accompanying rotation of the fishing line.

Figure 3:
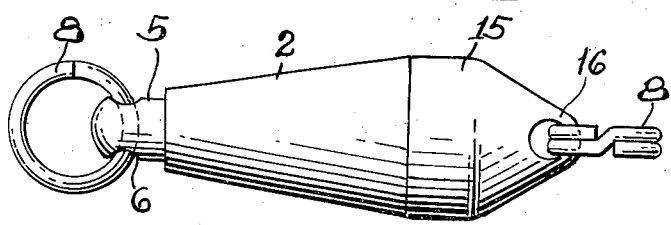
Fig. 3 is a side elevation of a swivel embodying a modified construction wherein a single swivel assembly is produced.

As shown in Fig. 3 a cap 15 may be screwed onto the body 2 of one of the swivel assemblies after the removal of the connecting sleeve therefrom. In such a modified construction a split ring 8 is secured to an eye 16 formed on the outer end of the cap for the attachment of a line or leader.

What I claim is:

1. In a swivel, a body having an axial bore and a tapered annular bearing surface at the inner end of the bore, a one piece spindle rotatably mounted in the bore and having means at its outer end for fastening a line or the like, the said spindle being formed with an enlarged head portion having a tapered annular surface arranged in longitudinally spaced but substantially parallel relation to the bearing surface of the body, a plurality of ball bearings positioned between and in engagement with the bearing surfaces, and means carried by the body for connecting a line or the like.

2. In a swivel, a tapered body having an axial bore and a tapered annular bearing surface at the inner end of the bore, a one piece spindle rotatably mounted in the bore and having an eye formed at its outer end, a ring rotatably connected to the eye, the said spindle having an enlarged head portion at its inner end and an enlarged cylindrical portion at its outer end, the said enlarged cylindrical portion being of slightly less diameter than the bore, and also smaller in diameter than the head portion, whereby the entry of foreign particles of a certain size into the bore is prevented, the said head portion having an annular tapered surface arranged in longitudinally opposed spaced relation to the tapered surface of the body, a plurality of ball bearings positioned between and in engagement with the opposed surfaces, and a second tapered body connected at its larger end to the enlarged end of the first mentioned tapered body and carrying means at its smaller end for connecting a line or the like.

3. In a swivel, a body having an axial bore of substantially uniform diameter throughout its length and having a tapered bearing surface at the inner end of the bore, a one piece spindle rotatably extending into the bore and having an enlarged head portion at its inner end, the said head having an annular tapered surface positioned in longitudinally opposed relation to the tapered bearing surface of the body, a plurality of ball bearings of substantially uniform size positioned between and in engagement with the said bearing surfaces, the said axial bore of the body being of greater diameter than the spindle except the head portion thereof, and the said spindle having a cylindrical portion adjoining the head portion of a diameter substantially one-half the diameter of the bore and substantially the same diameter as a ball bearing, and the said spindle having an outer cylindrical portion of greater diameter than the cylindrical portion adjoining the head but of slightly less diameter than the bore, and an eye carried at the outer end of the spindle.

4. In a swivel, a pair of tapered bodies connected together at their larger ends and having axially aligned bores, the said bodies each having a tapered bearing surface at the inner end of its bore, a one piece spindle mounted for independent rotation in the bore of each body and having an enlarged head at its inner end of larger diameter than the bore, each head having an annular tapered bearing surface arranged in longitudinally opposed and spaced relation to the bearing surface of its associated body, a plurality of ball bearings positioned between and in engagement with the bearing surfaces of each spindle and its associated body, an eye formed in the outer end of each spindle, and a ring rotatably extending through each eye.

ONEY A. JOHNSON.

REFERENCES CITED

The following references are of record in the file of this patent:

UNITED STATES PATENTS

| Number | Name | Date |
| --- | --- | --- |
| 342,850 | Smith | June 1, 1886 |
| 381,043 | Vauclain | Apr. 10, 1888 |
| 1,454,587 | Gunn | May 8, 1923 |
| 2,316,690 | Healy | Apr. 13, 1943 |

FOREIGN PATENTS

| Number | Country | Date |
| --- | --- | --- |
| 60,696 | Sweden | Oct. 24, 1923 |
| 446,688 | Great Britain | May 5, 1936 |